(12) United States Patent
Boillot et al.

(10) Patent No.: US 6,352,354 B1
(45) Date of Patent: Mar. 5, 2002

(54) LIGHT PINPOINTING DEVICE FOR A ROBOT

(75) Inventors: Jean-Paul Boillot, St-Bruno-de-Montarville; Jean-Claude Fontaine, Sainte-Foy; Dominique Frechette, Varennes, all of (CA)

(73) Assignee: Servo-Robot Inc., Saint-Bruno-de-Montarville (CA)

( * ) Notice: Subject to any disclaimer, the term of this patent is extended or adjusted under 35 U.S.C. 154(b) by 0 days.

(21) Appl. No.: 09/391,264

(22) Filed: Sep. 7, 1999

(30) Foreign Application Priority Data

Sep. 9, 1998 (CA) ............................................. 2244037

(51) Int. Cl.7 ............................................. B23K 9/095
(52) U.S. Cl. ........................ 362/253; 362/119; 362/89; 219/124.34; 901/42
(58) Field of Search ................................. 362/119, 120, 362/89, 253, 293, 235–237, 800, 311; 901/42; 33/252, 293, 503, 520; 219/124.34

(56) References Cited

U.S. PATENT DOCUMENTS

| | | | | |
|---|---|---|---|---|
| 4,303,967 A | * | 12/1981 | Letsche | 362/119 |
| 4,491,719 A | * | 1/1985 | Corby, Jr. | 219/124.34 |
| 4,831,233 A | * | 5/1989 | Gordon | 219/124.34 |
| 4,864,147 A | * | 9/1989 | Ikari et al. | 250/560 |
| 5,371,339 A | * | 12/1994 | Dillet et al. | 219/124.34 |
| 5,532,452 A | * | 7/1996 | Lechner | 219/124.34 |
| 5,534,705 A | * | 7/1996 | Terawaki et al. | 250/559.29 |
| 5,799,135 A | * | 8/1998 | Terawaki | 395/93 |
| 6,040,554 A | * | 3/2000 | Terada et al. | 219/124.34 |
| 6,046,431 A | * | 4/2000 | Beattie | 219/124.34 |
| 6,049,059 A | * | 4/2000 | Kim | 219/124.34 |

* cited by examiner

Primary Examiner—Stephen Husar
Assistant Examiner—Anabel Ton
(74) Attorney, Agent, or Firm—Altera Law Group, LLC

(57) ABSTRACT

The light pinpointing device is for producing a pinpointing light signal at an operative center point of a robot tool. The pinpointing light signal is useful to properly position the robot tool during the teaching phase. The light pinpointing device comprises a frame having first and second opposite ends, the first end being provided with a fastener for fastening the frame to an end of the robot tool. A light source assembly is provided to produce a pair of light beams inside the frame. A lens in front of the light source assembly is provided for directing the light beams through the second end of the frame in converging directions so that the light beams intersect with each other at a distance from the end of the robot tool corresponding to the operative center point thereof, thereby providing the pinpointing light signal.

6 Claims, 9 Drawing Sheets

LIGHT PINPOINTING DEVICE FOR A ROBOT

FIELD OF THE INVENTION

The present invention relates to a light pinpointing device to help in teaching a robot a path to be followed, and to assist in accurately determining the center point position of the robot tool.

BACKGROUND

In order to teach a welding robot a path to be followed, the operator must bring the tool to several positions along the joint or feature to be welded. At each position, the operator must carefully adjust the height, the orientation and the lateral position of the tool in order to get the optimal welding quality. The height and lateral position are normally adjusted with the help of a welding wire that is cut so that its tip corresponds to the robot tool's center point. The problem with this procedure is that the wire often hits the work piece and its position must again be adjusted in order to maintain good accuracy of the welding torch position.

SUMMARY

An object of the invention is to provide a light pinpointing device that overcomes the aforesaid drawback.

A subsidiary object of the invention is to provide a light pinpointing device for producing a pinpointing light signal at an operative center point of a robot tool, instead of using a welding wire.

According to the present invention, there is provided a light pinpointing device for producing a pinpointing light signal at an operative center point of a robot tool, comprising a frame having first and second opposite ends, the first end being provided with a means for fastening the frame to an end of the robot tool. A light source assembly is provided to produce a pair of light beams inside the frame. A lens in front of the light source assembly, is provided for directing the light beams through the second end of the frame in converging directions so that the light beams intersect with each other at a distance from the end of the robot tool corresponding to the operative center point thereof, thereby providing the pinpointing light signal.

BRIEF DESCRIPTION OF THE DRAWINGS

A detailed description of preferred embodiments will be given hereinbelow with reference to the following drawings, in which like numbers refer to like elements.

DETAILED DESCRIPTION OF THE PREFERRED EMBODIMENTS

Figure 1:
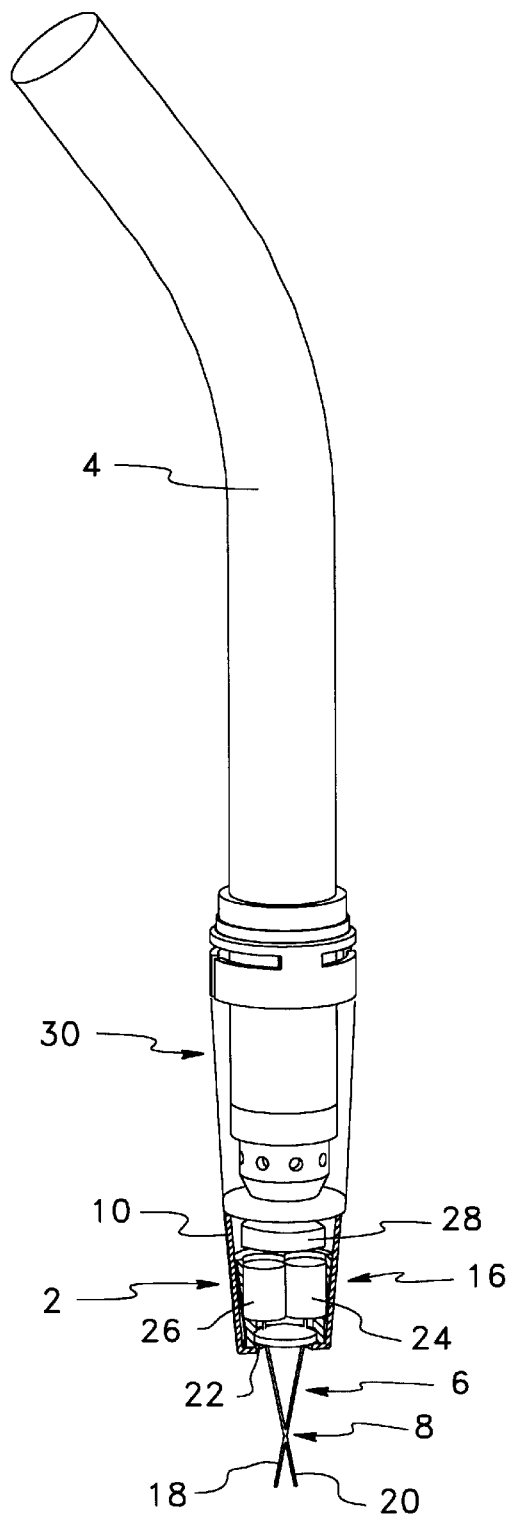
FIG. 1 is a side elevation partial view representing a standard welding torch equipped with the light pinpointing device according to the present invention.
Figure 2:
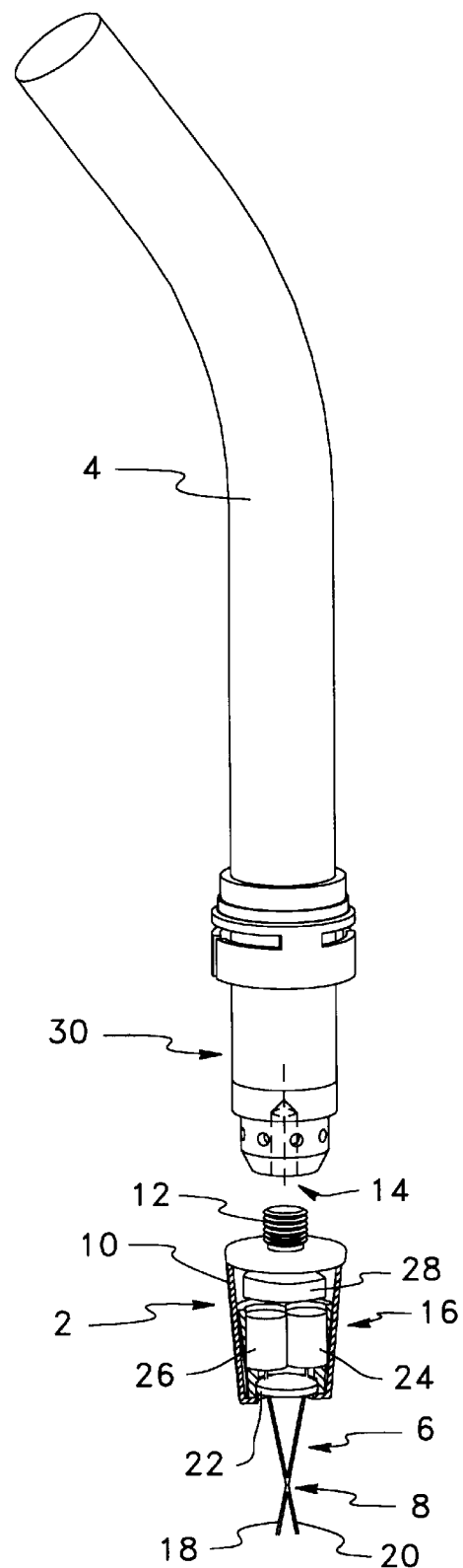
FIG. 2 is a side elevation view representing a light pinpointing device according to the present invention, removed from a welding torch.

Referring to FIG. 1, there is shown a light pinpointing device 2 according to the present invention, installed at the end of a standard welding torch 4, in replacement of a contact tip (not shown). The light pinpointing device 2 is for producing a pinpointing light signal 6 at an operative center point 8 of the welding torch 4 or any other robot tool. The device 2 comprises a frame 10 having first and second opposite ends, the first end being provided with a threaded bolt 12 as shown in FIG. 2, screwable into a threaded hole 14 at an end of the torch 4, where the contact tip (not shown) is normally installed. Other fastening arrangements that allow fastening of the device 2 to the robot tool can be used.

The device 2 has a light source assembly 16, for producing a pair of light beams 18, 20 inside the frame 10. The light source assembly may consist of a pair of side by side collimated light sources 24, 26 mounted inside the frame 10. Other light source arrangements may be used, examples of which are given hereinafter.

A lens 22 mounted at the second end of the frame 10, in front of the light source assembly 16, is provided to direct the light beams 18, 20 through the second end of the frame 10 in converging directions so that the light beams 18, 20 intersect with each other at a distance from the end of the torch 4 corresponding to the operative center point 8 thereof, thereby providing the pinpointing light signal. In this configuration, the light sources 24, 26 are mounted behind the lens 22. Other optical arrangements to direct and optionally process the light beams 18, 20 can be used.

A small battery 28 may be included inside the frame 10, to power the light sources 24, 26 that are thus connected to the battery for this purpose.

Preferably, the frame 10 has a size that fits in the nozzle 30 of the welding torch 4. However, such a feature is not essential since the nozzle 30 is easily removable and is not required while the light pinpointing device 2 is used.

Figure 3:
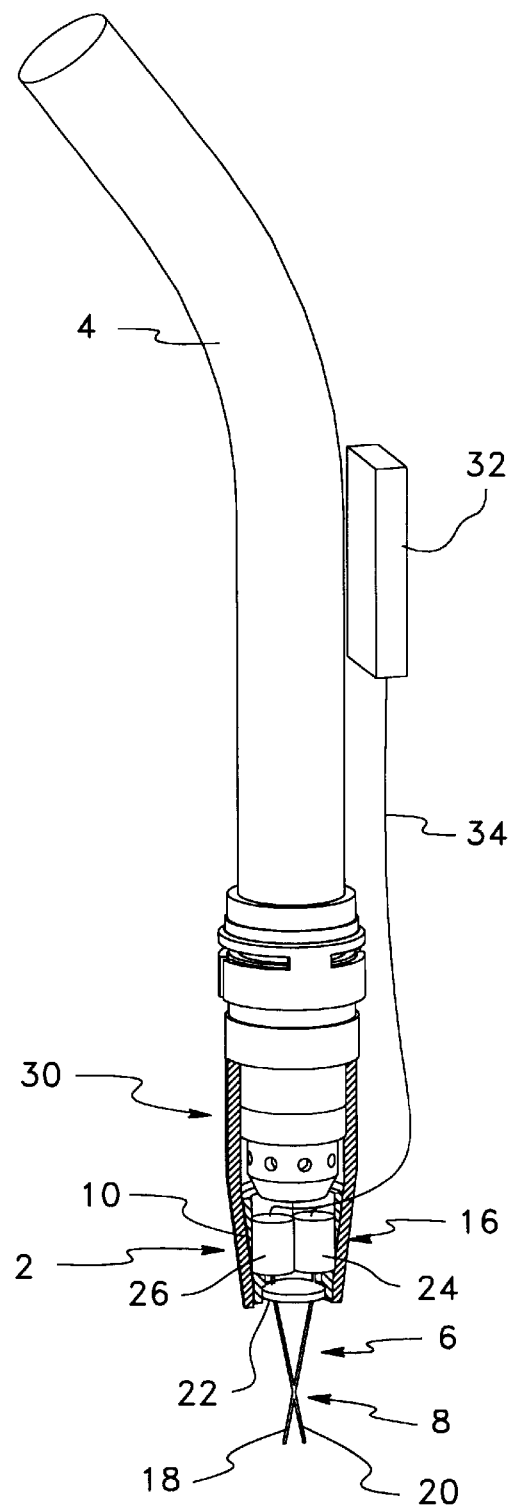
FIG. 3 is a side elevation view representing a light pinpointing device according to the present invention, powered by an external battery.

Referring to FIG. 3, a larger battery or a battery pack 32 having an extended battery life in comparison with a small battery, can be remotely installed for example on the welding torch 4 and connected to the light sources through a small cable 34 running through the frame 10, thereby allowing for external power supply connection. Alternatively, a power supply (not shown) can be used instead of an external larger battery.

Figure 4:
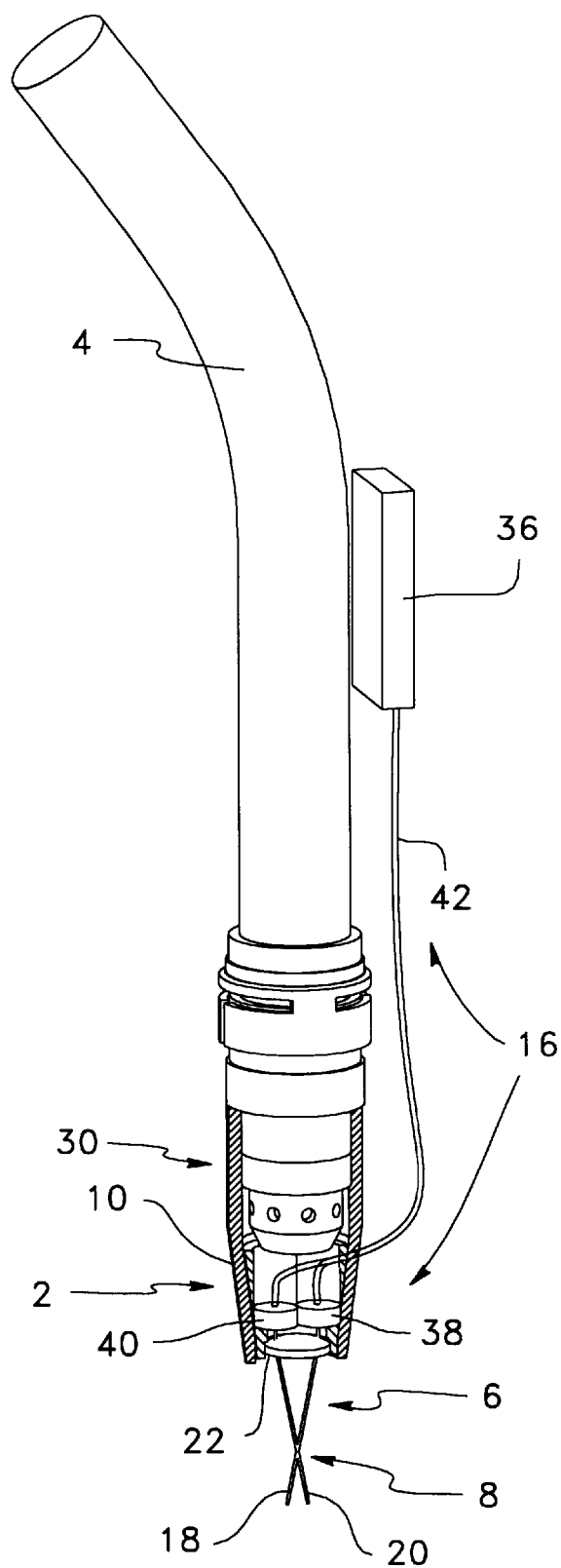
FIG. 4 is a side elevation view representing a light pinpointing device according to the present invention, with a light source remotely positioned on a torch.

Referring to FIG. 4, the light source assembly 16 can be formed of a light source 36 outside the frame 10, a pair of side by side collimating lenses 38, 40 mounted inside the frame 10 behind the lens 22, and a pair of optical fibers 42 running through the frame 10 and optically connecting the light source 36 to the collimating lenses 38, 40. The light source 36 can be remotely installed for example on the welding torch 4.

Figure 5:
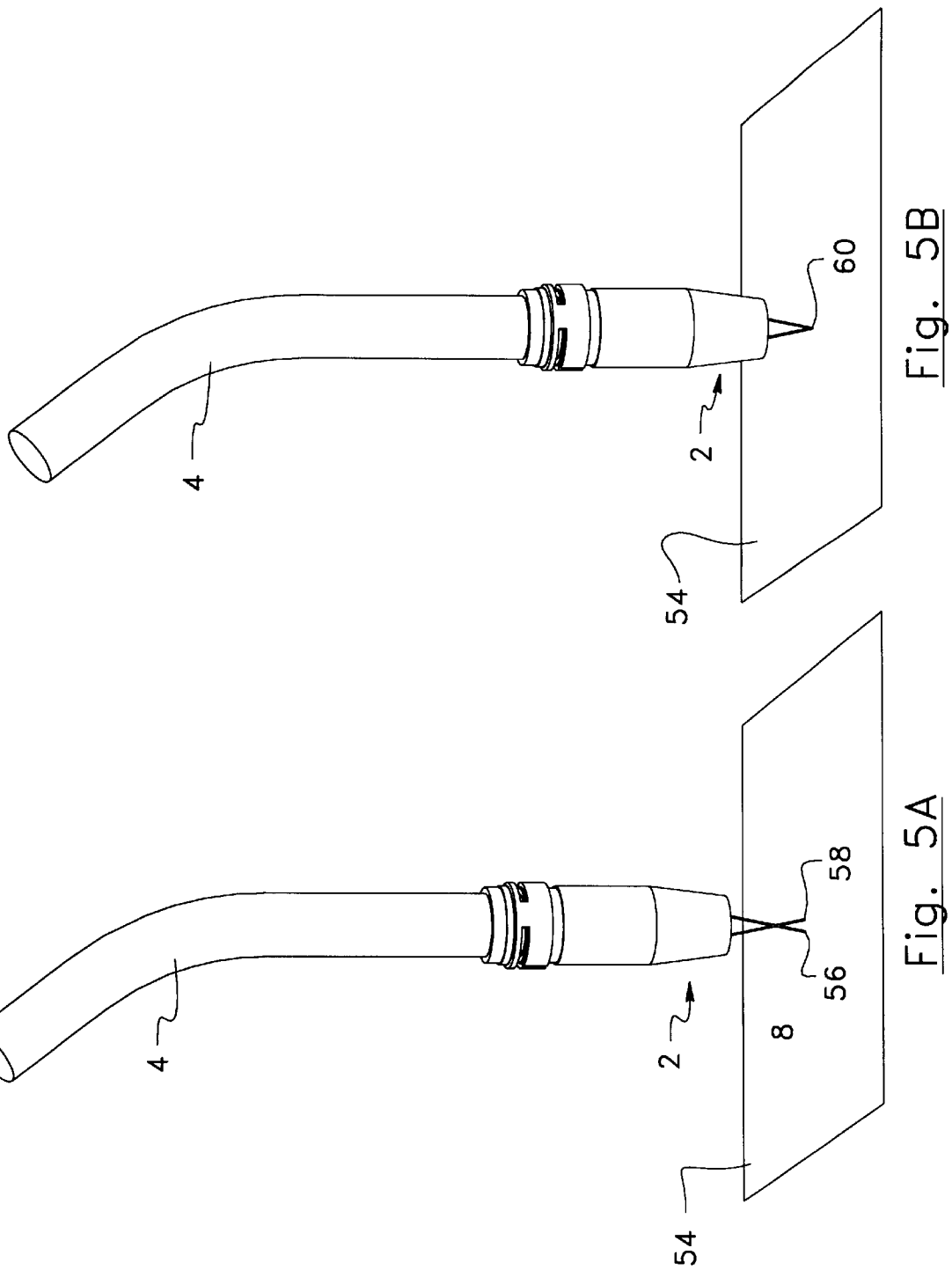
FIGS. 5a and 5b are side elevation views representing the light spots produced on a work piece by a light pinpointing device according to the present invention, when improperly and properly positioned over the work piece respectively.

Referring to FIGS. 1 and 5a, the lens 22 is adjusted so that the light beams 18, 20 cross each other at a position corresponding to the tool center point 8. When the tool 4 is too far or too close to the surface of the work piece 54, as shown in FIG. 5a, two light spots 56, 58 appear where the light beams 18, 20 intersect the surface. When the tool 4 is at the correct distance as shown in FIG. 5b, the two light beams 18, 20 intersect exactly on the surface of the work piece 54 and only one light spot 60 appears on the surface. To adjust the position of the tool or welding torch 4, the operator controls the robot 82 (shown in FIGS. 8 and 9) to move the tool 4 up or down until only one light spot is seen on the surface of the work piece 54.

However, the accuracy of this adjustment depends on the ability to recognize when the two light spots are perfectly overlapping to become only one light spot.

Figure 6:
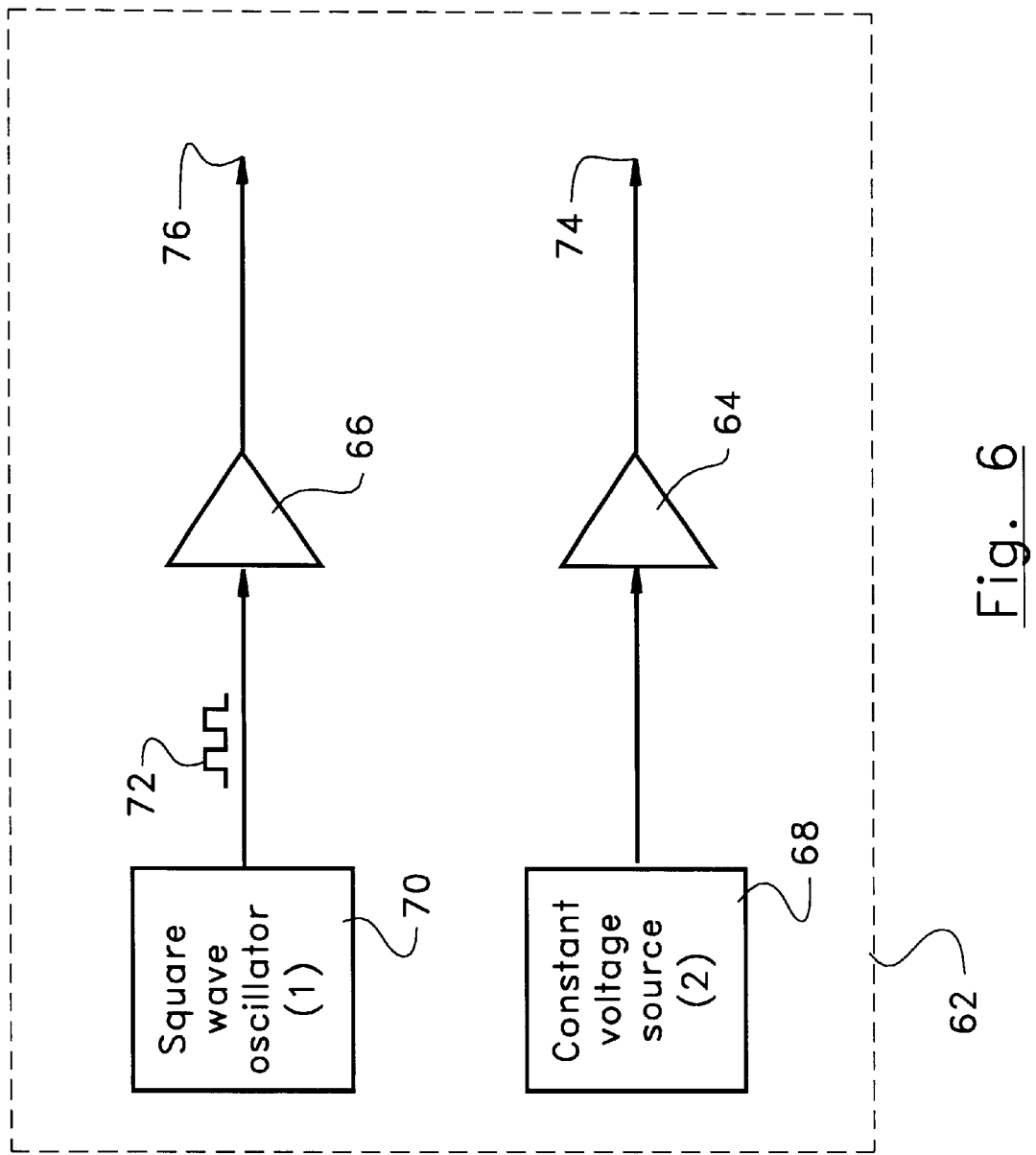
FIG. 6 is a schematic diagram representing a control circuit that causes the flashing of one of the light beams produced by a light pinpointing device according to the present invention.

Referring to FIGS. 1 and 6, a control circuit 62 can be provided to control the operation of the light source assembly 16, for example, to drive one of the light sources 24, 26 with an intermittent signal, thereby causing one of the light beams 18, 20 to flash. By alternately turning the selected light source 24 or 26 ON and OFF, the operator will more easily see a change in the shape of the light spot on the surface of the work piece 54 if the two light spots are not perfectly overlapping. The control circuit 62 has two power amplifiers 64, 66 that provide outputs 74, 76 to drive the two light sources 24, 26. One of the power amplifiers 64, 66 is driven by a constant voltage source 68, while the other one is driven by a square wave generator 70 so that the power amplifier 66 provides current to the light source 24 or 26 to which it is connected when the signal 72 is high and stops providing current when the signal 72 is low, so that the light source 24 or 26 is alternately switched ON and OFF. Thus, the output 76 is connected to the light source 24 or 26 operated in a flashing mode while the output 74 is connected to the light source 24 or 26 operated in a constant power mode.

Figure 7:
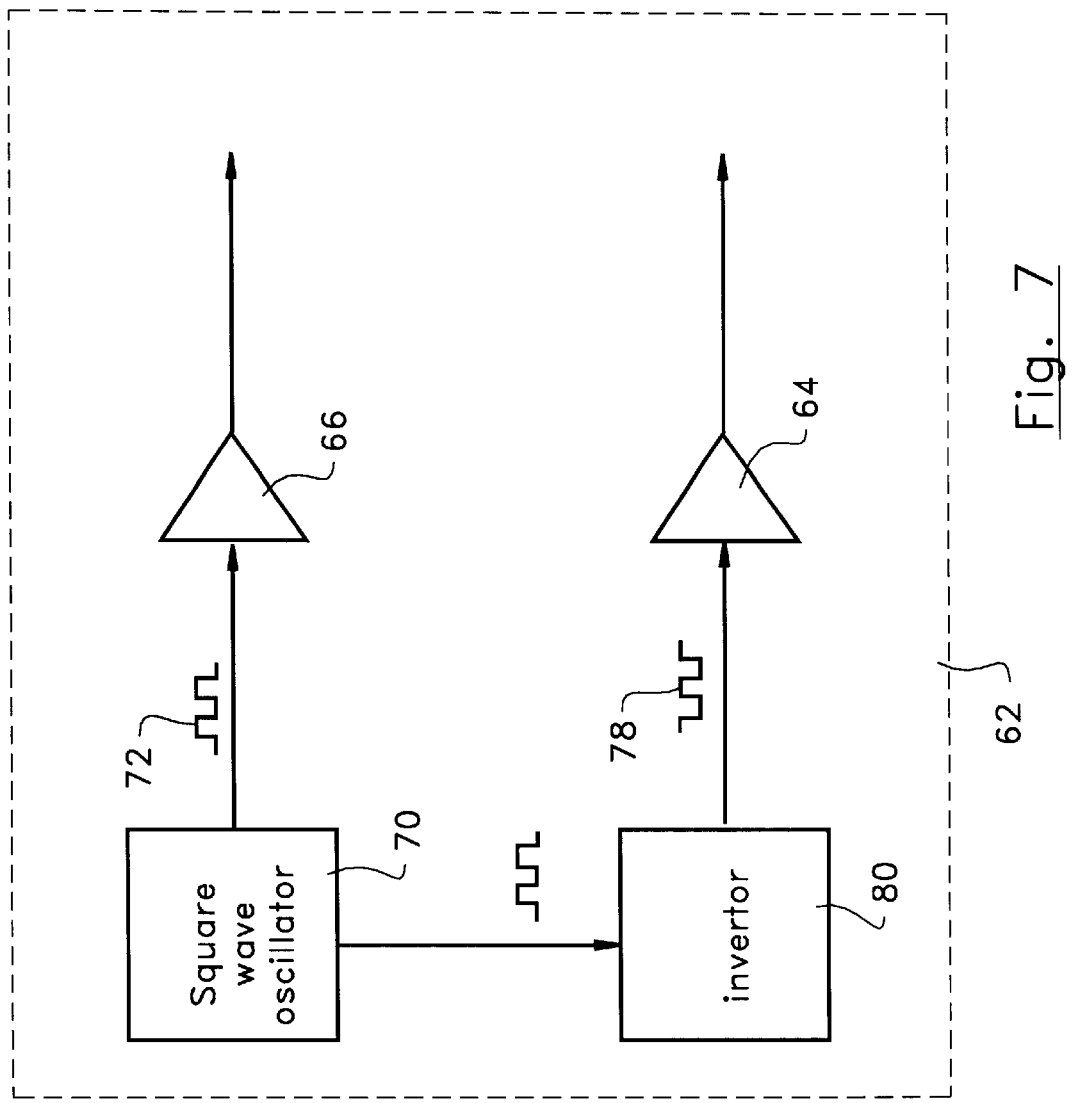
FIG. 7 is a schematic diagram representing a control circuit that causes the alternate flashing of the light beams produced by a light pinpointing device according to the present invention.

Referring to FIG. 7, the control circuit 62 can be embodied to drive the power amplifiers 64, 66 of each light sources 24, 26 with intermittent signals 72, 78 of opposite phase so that the light sources 24, 26 are alternately switched ON and OFF. As long as the light spots do not perfectly overlap on the surface of the work piece 54, they will appear to flash. However, when they overlap perfectly, the full surface of the light spot is continuously turned ON and the flashing effect disappears. This effect is easier to detect than the perfect superposition of two light spots. To this effect, the constant voltage source 68 of the former embodiment of the control circuit 62 is replaced by an invertor 80 connected between the square wave generator 70 and the power amplifier 64.

Referring to FIGS. 1, 5a and 5b, the light beams 18, 20 may have different colors selected to produce a resulting distinctive color at the operating center point 8 where the light beams 18, 20 mix together. For example, if one of the light sources 24, 26 emits a red light and the other emits a green light, then the perfect overlapping of the two light spots on the surface of the work piece 54 is detected when the light spot 60 is completely yellow. Light sources 24, 26 with other colors can also be used for this purpose.

Figure 8:
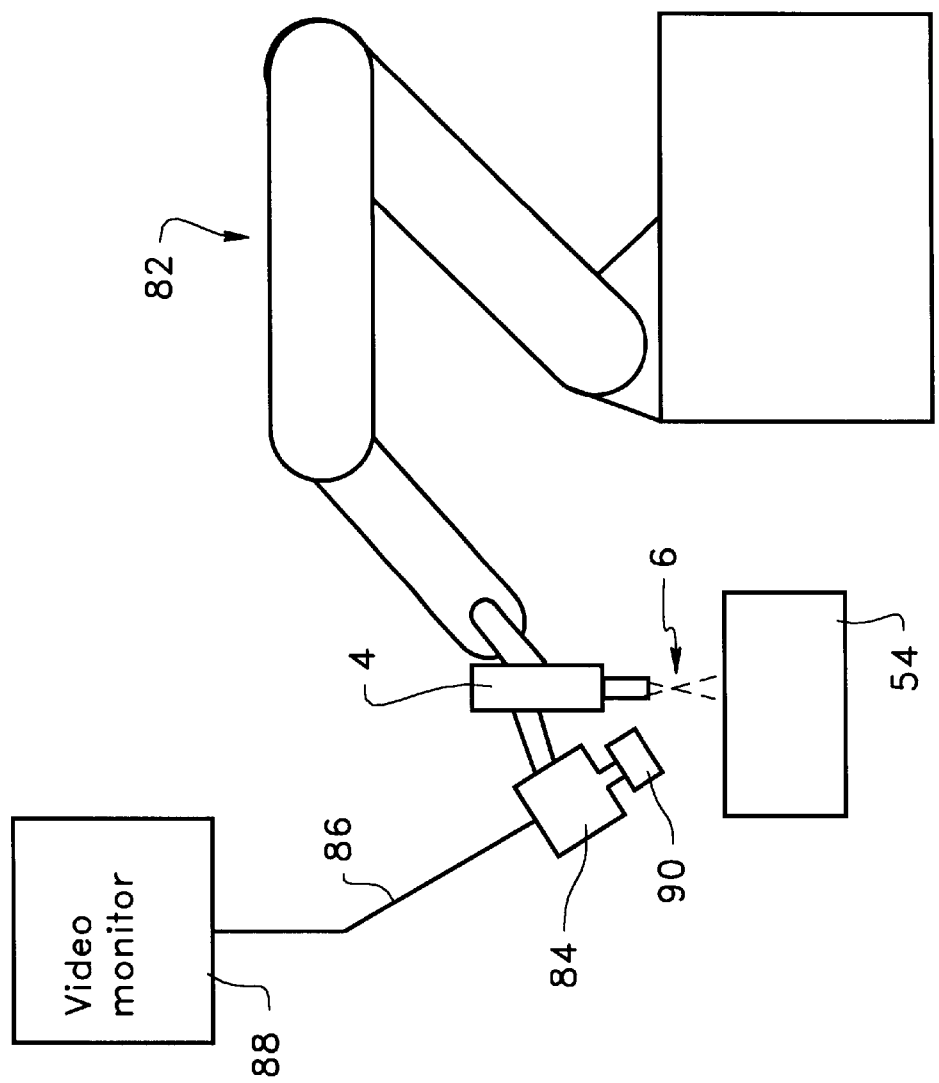
FIG. 8 is a schematic diagram representing a video camera and monitor arrangement combined with a light pinpointing device on a torch, according to the present invention.

Referring to FIG. 8, a video camera 84 can be installed on the tool or welding torch 4, so that the light spots on the surface of the work piece 54 are in its field of vision covering a zone including the operative center point of the robot tool 4. The video signal of the camera 84 is transmitted through the cable 86 to a remote video monitor 88 that displays the images of the video camera 84. A magnifying lens 90 can be installed on the video camera 84 to increase the dimension of the light spots, so that the operator can more easily detect when they overlap.

Figure 9:
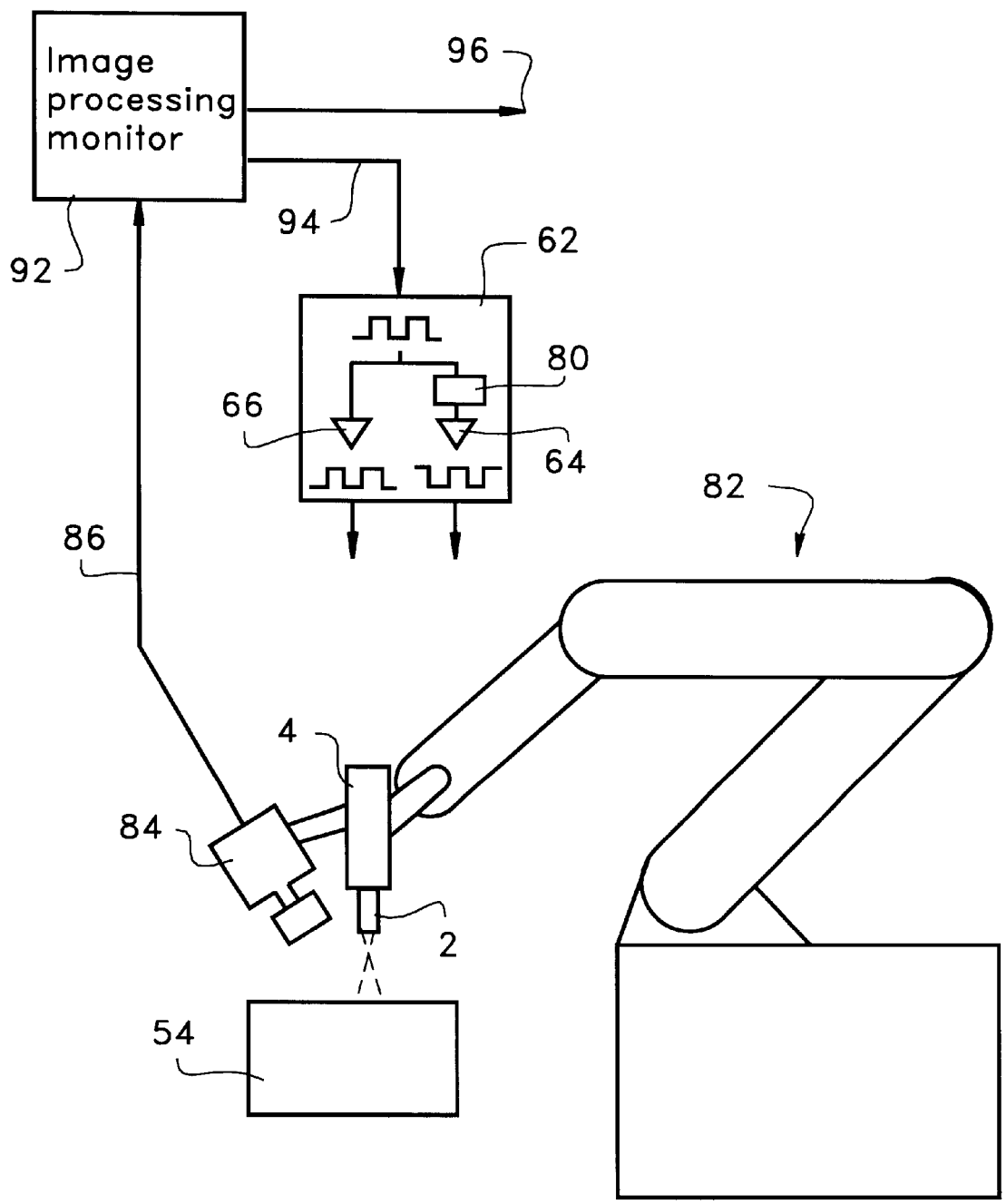
FIG. 9 is a schematic diagram representing a video camera and image processing computer arrangement combined with a light pinpointing device on a torch, according to the present invention.

Referring to FIG. 9, an image processing computer or equipment 92 can also be used to automatically process the images captured by the video camera 84 and determine when the light spots overlap on the surface of the work piece 54. The video signal from the video camera 82 is transmitted to the image processing computer 92. The light spots produced by the light pinpointing device 2 are controlled to alternately flash by the control circuit 62 which is synchronized for this purpose with the successive captured images by the computer 92 through a synchronization link 94, so that in one image, one light spot is visible and in the next image, the other light spot is visible. When the tool 4 is not at the correct distance from the surface of the work piece 54, the light spots are not detected at the same position in successive images. As the tool center point gets closer to the surface of the work piece 54, the light spots get closer. When the correct distance is reached, the image processing computer detects the light spots at the same position in successive images. This equipment can produce a signal on an output 96 to inform the operator when the correct position of the tool center point of the robot 82 is reached. This equipment can also communicate with the control unit of the robot so that the robot 82 can automatically position the tool 4 and for proper positioning of the operative center point.

While embodiments of this invention have been illustrated in the accompanying drawings and described above, it will be evident to those skilled in the art that changes and modifications may be made therein without departing from the essence of this invention. All such modifications or variations are believed to be, within the scope of the invention as defined by the claims appended hereto.

What is claimed is:

1. A light pinpointing device for producing a pinpointing light signal at an operative center point of a robot tool, comprising:
   a frame having first and second opposite ends, the first end being provided with a means for fastening the frame to an end of the robot tool wherein the end of the tool comprises a threaded hole;
   a light source means for producing a pair of light beams inside the frame
   a means for fastening the light source comprising a threaded bolt screwable in the threaded hole; and
   a means in front of the light source means, for directing the light beams through the second end of the frame in converging directions so that the light beams intersect with each other at a distance from the end of the robot tool corresponding to the operative center point thereof, thereby providing the pinpointing light signal.

2. A light pinpointing device for producing a pinpointing light signal at an operative center point of a robot tool, comprising:
   a nozzle;
   a frame having first and second opposite ends, the first end being provided with a means for fastening the frame to an end of the robot tool wherein the frame is a size that fits in the nozzle;
   a light source means for producing a pair of light beams inside the frame; and
   a means in front of the light source means, for directing the light beams through the second end of the frame in converging directions so that the light beams intersect with each other at a distance from the end of the robot tool corresponding to the operative center point thereof, thereby providing the pinpointing light signal.

3. A light pinpointing device for producing a pinpointing light signal at an operative center point of a robot tool, comprising:

a frame having first and second opposite ends, the first end being provided with a means for fastening the frame to an end of the robot tool;

a light source means for producing a pair of light beams inside the frame; and a means in front of the light source means, for directing the light beams through the second end of the frame in converging directions so that the light beams intersect with each other at a distance from the end of the robot tool corresponding to the operative center point thereof, thereby providing the pinpointing light signal;

a power means mounted inside the frame, for powering the light source means wherein the power means comprises a battery connected to the light source means.

4. A light pinpointing device for producing a pinpointing light signal at an operative center point of a robot tool, comprising:

a frame having first and second opposite ends, the first end being provided with a means for fastening the frame to an end of the robot tool;

a light source means for producing a pair of light beams inside the frame; and a means in front of the light source means, for directing the light beams through the second end of the frame in converging directions so that the light beams intersect with each other at a distance from the end of the robot tool corresponding to the operative center point thereof, thereby providing the pinpointing light signal;

a control circuit means for controlling operation of the light source means wherein the control circuit means comprises means for causing one of the light beams to flash.

5. A light pinpointing device for producing a pinpointing light signal at an operative center point of a robot tool, comprising:

a frame having first and second opposite ends, the first end being provided with a means for fastening the frame to an end of the robot tool;

a light source means for producing a pair of light beams inside the frame; and a means in front of the light source means, for directing the light beams through the second end of the frame in converging directions so that the light beams intersect with each other at a distance from the end of the robot tool corresponding to the operative center point thereof, thereby providing the pinpointing light signal;

a control circuit means for controlling operation of the light source means wherein the control circuit means comprises means causing the light beams to flash alternately.

6. The light pinpointing device according to claim 5, in combination with a video camera mounted onto the robot tool and having a view on a zone including the operative center point of the robot tool, and a remote image processing computer connected to the video camera, the computer having a synchronization output connected to the control circuit means, the control circuit means alternately flashing one of the light beams for successive captured images.

* * * * *